(12) United States Patent
Ruan et al.

(10) Patent No.: US 12,518,794 B1
(45) Date of Patent: Jan. 6, 2026

(54) VIDEO EDITING SYSTEM AND VIDEO EDITING METHOD

(71) Applicant: INSTITUTE FOR INFORMATION INDUSTRY, Taipei (TW)

(72) Inventors: Ming-Da Ruan, Taipei (TW); Hsiao-Chen Chang, Taipei (TW); Rong-Sheng Wang, Taipei (TW); Shih-Chun Chou, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 18/957,905

(22) Filed: Nov. 25, 2024

(30) Foreign Application Priority Data

Oct. 16, 2024  (TW) ................................ 113139427

(51) Int. Cl.
| | |
|---|---|
| *G11B 27/00* | (2006.01) |
| *G06T 7/246* | (2017.01) |
| *G06T 7/292* | (2017.01) |
| *G06V 20/40* | (2022.01) |
| *G11B 27/031* | (2006.01) |
| *G11B 27/34* | (2006.01) |

(52) U.S. Cl.
CPC ............ *G11B 27/031* (2013.01); *G06T 7/248* (2017.01); *G06T 7/292* (2017.01); *G06V 20/42* (2022.01); *G11B 27/34* (2013.01); *G06T 2207/10016* (2013.01); *G06T 2207/30224* (2013.01); *G06T 2207/30241* (2013.01)

(58) Field of Classification Search
CPC ....... G11B 27/00; G11B 27/031; G11B 27/34; G06V 20/42; G06T 7/292; G06T 7/248
USPC ................ 386/201, 200, 239, 248, 278, 282
See application file for complete search history.

(56) References Cited

U.S. PATENT DOCUMENTS

| | | | |
|---|---|---|---|
| 2023/0100572 A1* | 3/2023 | Jayaram .................. | G06T 19/00 345/419 |
| 2023/0289981 A1* | 9/2023 | Habib ...................... | G01P 13/00 |
| 2024/0173608 A1* | 5/2024 | Schembs ................ | A63B 71/06 |

FOREIGN PATENT DOCUMENTS

| | | |
|---|---|---|
| CN | 111291617 A | 6/2020 |
| CN | 114494356 A | 5/2022 |

* cited by examiner

*Primary Examiner* — Daquan Zhao
(74) *Attorney, Agent, or Firm* — CKC & Partners Co., LLC

(57) ABSTRACT

A video editing system, comprising a first camera, multiple second cameras and a processing device. The first camera and the second cameras respectively capture a first video and multiple second videos of a sports field. The processing device is configured to achieve temporal synchronization among the first camera and the second cameras. The processing device is configured to: obtain the first video from first camera, and obtain the second videos from the second cameras; detect a ball in the first video; analyze a ball trajectory to extract a timestamp; find at least one of the second cameras corresponding to the ball trajectory and at least one of the second videos according to the ball trajectory; and edit the at least one of the second videos according to the timestamp to generate an edited video.

20 Claims, 6 Drawing Sheets

BT

VIDEO EDITING SYSTEM AND VIDEO EDITING METHOD

CROSS-REFERENCE TO RELATED APPLICATION

This application claims priority to Taiwan Application Serial Number 113139427, filed Oct. 16, 2024, which is herein incorporated by reference in its entirety.

BACKGROUND

Technical Field

The present disclosure relates to video editing technology, and in particular to a video editing system and a video editing method.

Description of Related Art

Currently, sports video editing mostly requires manual work. Capturing and editing with multiple cameras requires the use of high-resolution cameras and expensive equipment. For example, the broadcast of sports games uses multiple cameras arranged at different positions to capture the games from different angles. However, this method of broadcasting requires high construction costs and requires professionals to control it, and cannot be applied to ordinary sports field. Therefore, there is a need for a system that is easier to arrange, control, and can edit videos, which can be arranged in ordinary sports field to capture sports videos of ordinary people or athletes, and automatically edit to produce videos that meet specific needs.

SUMMARY

One aspect of the present disclosure is a video editing system, comprising a first camera, a plurality of second cameras and a processing device. The first camera is configured to capture a first video of a sports field. The plurality of second cameras is configured to capture a plurality of second videos of the sports field. The plurality of second cameras has a plurality of arrangement positions, and the plurality of arrangement positions is different from each other. The processing device is communicatively connected to the first camera and the plurality of second cameras, and is configured to achieve temporal synchronization among the first camera and the plurality of second cameras. The processing device is configured to: obtain the first video from first camera, and obtain the plurality of second videos from the plurality of second cameras; detect a ball in the first video; analyze a ball trajectory to extract a timestamp; find at least one of the plurality of second cameras corresponding to the ball trajectory and at least one of the plurality of second videos according to the ball trajectory; and edit the at least one of the plurality of second videos according to the timestamp to generate an edited video.

Another aspect of the present disclosure is a video editing method, comprising: achieving temporal synchronization among a processing device, a first camera and a plurality of second cameras; capturing a first video of a sports field by the first camera, and capturing a plurality of second videos of the sports field by the plurality of second cameras, wherein the plurality of second cameras has a plurality of arrangement positions, and the plurality of arrangement positions is different from each other; detecting a ball in the first video by the processing device; analyzing a ball trajectory to extract a timestamp; finding at least one of the plurality of second cameras corresponding to the ball trajectory and at least one of the plurality of second videos according to the ball trajectory; and editing the at least one of the plurality of second videos according to the timestamp to generate an edited video.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
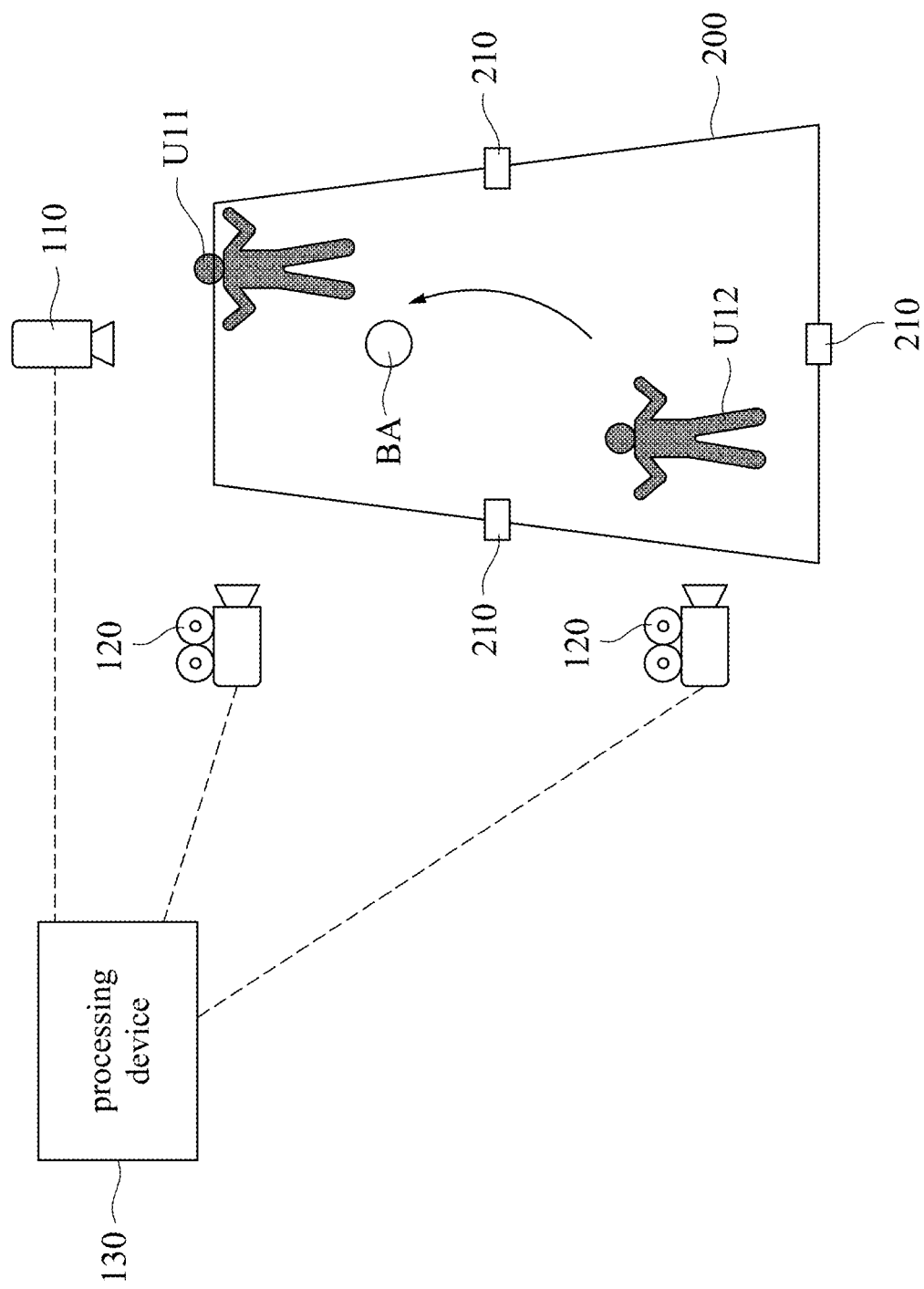
FIG. 1 is a schematic diagram of a video editing system in some embodiments of the present disclosure.
Figure 2:
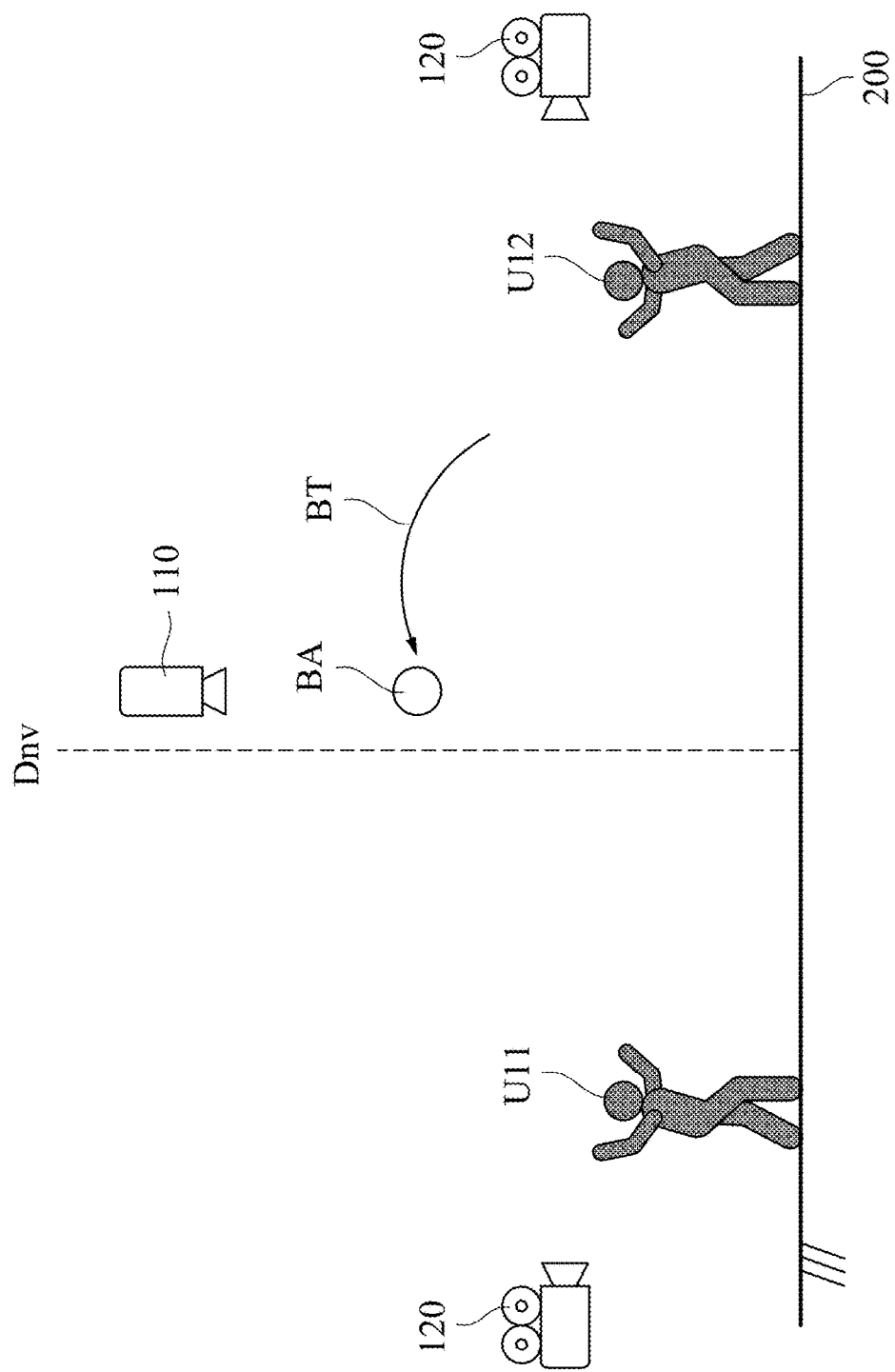
FIG. 2 is a schematic diagram of the video editing system in another direction in some embodiments of the present disclosure.

FIG. 1 and FIG. 2 are schematic diagrams of a video editing system 100 in different directions in some embodiments of the present disclosure. The video editing system 100 is applied to a sports field 200 to capture a sports scene and edit the captured original video to generate an edited video.

The sports field 200 is configured to used for one or more users U11, U12. The aforementioned "sport" is a kind of ball game. That is, a ball BA moves in the sports field as the game progresses. "Sports field" can be a court or a sports training ground, such as a badminton court, a tennis court, a volleyball court, a table tennis court, a baseball field, a basketball court, a golf swing practice site, a baseball batting cage, etc.

The video editing system 100 includes a first camera 110, multiple second cameras 120 and a processing device 130. The arrangement position of the first camera 110 corresponds to the sports field 200, so as to capture a video of the sports field (hereinafter referred to as "first video"). The arrangement positions of the second cameras 120 also correspond to the sports field 200, but each of the second cameras 120 has different arrangement position (i.e., arrangement positions of of the second cameras 120 are different from each other), so as to capture videos (hereinafter referred to as "second videos") of the sports field from different directions/angles/, and these directions are different from the direction of the first camera 110.

In one embodiment, the first camera 110 is configured to capture a full shot area of the sports field 200 to generate the first video, so that the video editing system 100 can analyze the first video to determine how to edit.

Specifically, a camera direction of the first camera 110 is vertically facing the sports field 200 (e.g., placed directly above), the first video from a bird's-eye view. In other words, the camera direction of the first camera 110 is a normal vector Dnv of the sports field 200. Therefore, when the video editing system 100 analyzes the first video, the video editing system 100 detects the ball BA and a ball trajectory BT in a planar manner. In contrast, the camera direction of each second camera 120 corresponds to different angles/directions of the sports field 200 (e.g., placed around the field), and is mainly used to capture the user's posture.

The processing device 130 is communicatively connected to the first camera 110 and the second camera 120 to receive the first video and the second videos. The processing device 130 is configured to analyze the sports situation according to the first video (i.e., the full shot of the sports field 200), and selectively selects one or more of the second videos to edit according to the analysis result.

The video editing system 100 of the present disclosure is not only easy to arrange, but also can automatically generate the edited video according to the analysis result. It can be easily used by general users or sports fields. For the convenience of explanation, the video editing system 100 in FIG. 1 and FIG. 2 is taken as an example to illustrate the operation details of the video editing system 100 as follows.

Figure 3:
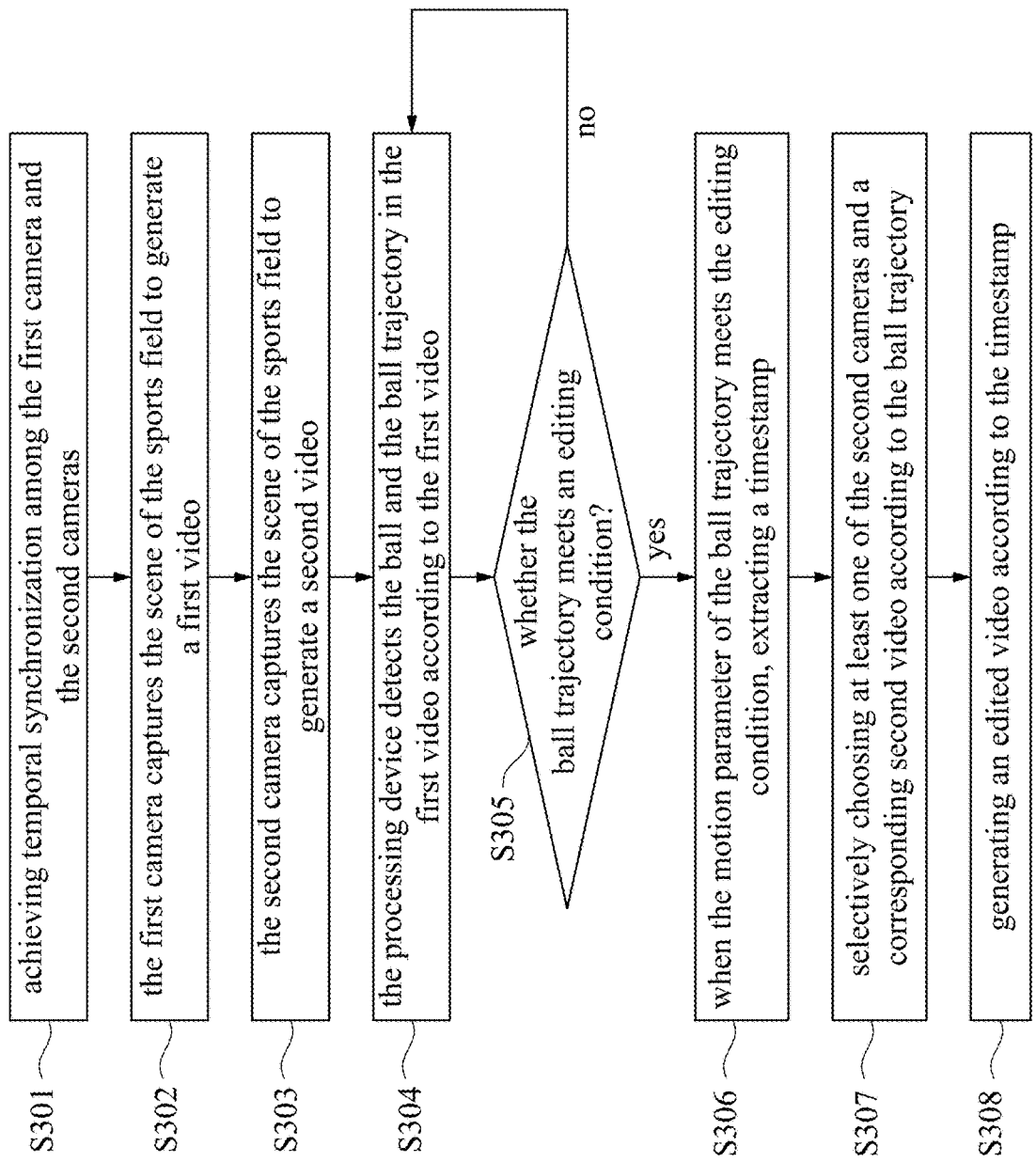
FIG. 3 is a flowchart illustrating a video editing method in some embodiments of the present disclosure.

FIG. 3 is a flowchart illustrating a video editing method in some embodiments of the present disclosure. Before performing the video editing method, the processing device 130 is communicatively connected to the first camera 110 and the second cameras 120. The processing device 130 can be a equipment provided by Internet service providers or the sports field providers, such as computers, servers, cloud computing devices, and it can also be a terminal device of the user, such as a personal computer, laptop or smartphone. The processing device may be an independent electronic device, or may be combined/assembled/integrated into the first camera 110 or the second camera 120, or may be a terminal device of the user.

In step S301, the first camera 110, the second camera 120 and the processing device 130 are achieved temporal synchronization. That is, the first camera 110, the second camera 120 and the processing device 130 correct the time parameter, such as uniformly correct to 10:05. For example, any one of the first camera 110, the second camera 120 and the processing device 130 can transmit the time parameter to the others, or the first camera 110 and the second camera 120 obtain the time parameter from the processing device 130 to correct their own time parameter.

In step S302, the first camera 110 captures the scene of the sports field 200 to generate a first video, and the first camera 110 instantly transmits the first video to the processing device 130.

Specifically, when starting capturing the first video, the first camera 110 detects at least three targets 210 of the sports field 200 to establish a coordinate system of the sports field 200. This establishment also can be performed by the processing device 130. That is, after the processing device 130 receives the first video, the processing device 130 determines whether positions of the three targets 210 in the first video meet the three relative coordinates established in advance. The aforementioned "target" can be a fixed object of the sports field 200, such as one of the multiple sidelines of the court, one of the two end points of the net of the badminton court or tennis court, one of multiple features of the basketball stand, or one of multiple features of football's goal area. The aforementioned "target" can also be any object defined in advance.

In some embodiments, when the processing device 130 or the first camera 110 performs correction, the processing device 130 will simultaneously establish a coordinate data (e.g., the coordinate system) of the sports field 200 according to the targets 210. At the same time, the processing device 130 can also identify or establish the corresponding coordinate of each second camera 120 an/or the target 210 in the coordinate system, so that the processing device 130 can detect the ball trajectory BT according to the established coordinate system and the coordinates.

In step S303, after the first camera 110 performs correction and the users U11, U12 starts to sports, the second camera 120 captures the scene of the sports field 200 to generate a second video.

In step S304, the processing device 130 detects the ball BA and the ball trajectory BT in the first video according to the first video. In one embodiment, the processing device 130 stores a corresponding video/image of the ball BA, so as to detect the ball BA in the first video by using image recognition technology. Since one of ordinary skill in the art can understand the methods of detecting targets in the video, and thus they are not further detailed herein.

In step S305, the processing device 130 analyzes the ball trajectory BT, and determines whether a motion parameter of the ball trajectory BT meets an editing condition. The "editing condition" is configured to determine whether there is nice play, such as smashing, killing, scoring, multiple attack and defense transitions. The editing condition is related to the motion parameter, such as at least one or a combination of speed, acceleration, trajectory length and change angle of the ball BA or the ball trajectory BT. Examples of setting and determination of the editing condition will be detailed in subsequent paragraphs. In other embodiments, the motion parameter may also be the user's posture trajectory or movement speed, etc.

In step S306, when confirming the motion parameter of the ball trajectory BT meets the editing condition, the processing device 130 extracts/establishes a timestamp. The processing device 130 sets the timestamp in the first video, or stores the timestamp in internal memory. "Timestamp" can be expressed such as "10:08". In some embodiments, the processing device 130 determines the length of a highlight to be edited according to the timestamp. The length of the edited time may be a preset time length. For example, it can be calculated as five seconds before the timestamp, or ten seconds starting from five seconds prior to the ball landing or hitting the net. In other embodiments, the length of the edited time of the second video may also be determined by the ball trajectory BT. For instance, it can start three seconds before the timestamp and extend until two seconds after the ball BA lands.

In step S307, after establishing the timestamp, the processing device 130 selectively choose/select/find at least one of the second cameras 120 and the corresponding second video(s) according to the ball trajectory BT. The chosen/selected/found second camera 120 corresponds to the ball trajectory BT, so the corresponding second video is suitable for record the highlight/nice play. Specifically, the processing device 130 selects the second camera 120 according to a direction of the ball trajectory BT. For example, according to a first motion direction of the ball trajectory BT (e.g., the direction facing the ball, used to record the nice play), or according to a second motion direction opposite to the ball trajectory BT (e.g., facing the user hitting the ball, used to record the "movement of user").

In step S308, after obtaining at least one of the second videos, the processing device 130 edits the second video according to the timestamp to generate an edited video. The aforementioned "editing" may refer to the processing device 130 capturing some partial fragments of the second video corresponding to the timestamp. The processing device 130 may further include adding special effects, such as slowing down the playback speed of partial fragment, enlarging specific areas of the partial screen, adding sound effects (e.g., cheers), and adding animations (e.g., applause, fireworks).

By analyzing the first video, the video editing method of the present disclosure can find the appearance time of the nice play, and by detecting the ball trajectory BT, select the suitable second camera 120 to automatically edit a short video according to the corresponding second video. The aforementioned analysis and determination conditions of the processing device 130 can be set in advance and stored in the processing device 130 (or a corresponding memory). Therefore, the video editing method does not need to be operated by professionals and does not require complicated controls, and can be easily applied to various sports field.

The following describes the setting method of "the editing condition" for determining the nice play in the aforementioned step S305. In one embodiment, the user can upload a reference video representing the nice play to the processing device 130 (or a storage device connected thereto, not shown in the figure). The processing device 130 can analyze changes in an image of the reference video according to the reference video to generate the editing condition. For example, the processing device 130 detects the ball BA and the ball trajectory BT in the reference video, and uses the motion parameter of the ball trajectory BT as an editing condition, such as determining whether a movement distance of the ball BA reaches a specific value, or determining whether the ball BA changes direction quickly. In another embodiment, the processing device 130 can further directly use the reference video as an editing condition for determining. For example, when the processing device 130 analyzes the first video, the processing device 130 compares the reference video with the first video, so as to determine whether there is a fragment in the first video that are similar to the reference video. If the user's specific movement or speed meets the editing condition, establishing the timestamp in the first video. In another embodiment, the processing device 130 may provide an operation interface to allow the user to set the editing condition.

In some embodiments, the processing device 130 can be preset with an analysis algorithm. The analysis algorithm not only includes "the editing condition" to determine the nice play, but can also be used to determine sports situations, including the motion state of the ball BA (e.g., the aforementioned step S304). For example, determining the serve in sports, the landing point of the ball BA, and the hitting point of the ball BA. Another example is the status of user, such as specific movement, the change speed and angle of specific parts (e.g., hands, ankles).

For example, after the processing device 130 detects the ball BA and the ball trajectory BT, the processing device 130 uses the analysis algorithm to analyze the ball BA and the ball trajectory BT. If the ball BA starts to move from rest and the acceleration exceeds a preset value, it can be determined as a "serve". Correspondingly, if the speed of the ball trajectory BT becomes zero and the ball BA remains stationary for more than a preset value, it can be determined as "landing". On the other hand, if the change in the movement direction of the ball trajectory BT exceeds a preset angle, it can be determined as a "hit point". The processing device 130 can record the ball trajectory BT process as different rally (e.g., a round or an attack and defense transitions) according to the recognized motion situations.

Following the above, if a "hit point" appears and the speed/acceleration of the ball BA/the ball trajectory BT after hitting the ball exceeds a preset value, it can be determined that a "kill ball" has appeared. If there are multiple hits in a short period of time, it can be determined that there are sports situations such as "rapidly exchanging ball" and "an intense attack and defense transitions". The motion parameter (e.g., ball speed, change angle) corresponding to these specific sports situations (e.g., killing the ball) can be used as the aforementioned "editing condition".

In addition, in some other embodiments, the editing condition can also include some determination conditions other than images. For example, the processing device 130 can determine the audio of the first video. If there is an obvious change in the audio (e.g., cheers), or a specific sound is detected/identified by using speech recognition technology (e.g., "Score!", "Home run!"), it can be determined that the editing condition is met.

In some embodiments, the processing device 130 can record a starting point of a rally when determining "serve". If the processing device 130 determines that the first video meets the editing condition multiple times in one rally, the processing device 130 selects a later time point (i.e., closer to the scoring moment) and records it as the timestamp.

Figure 4:
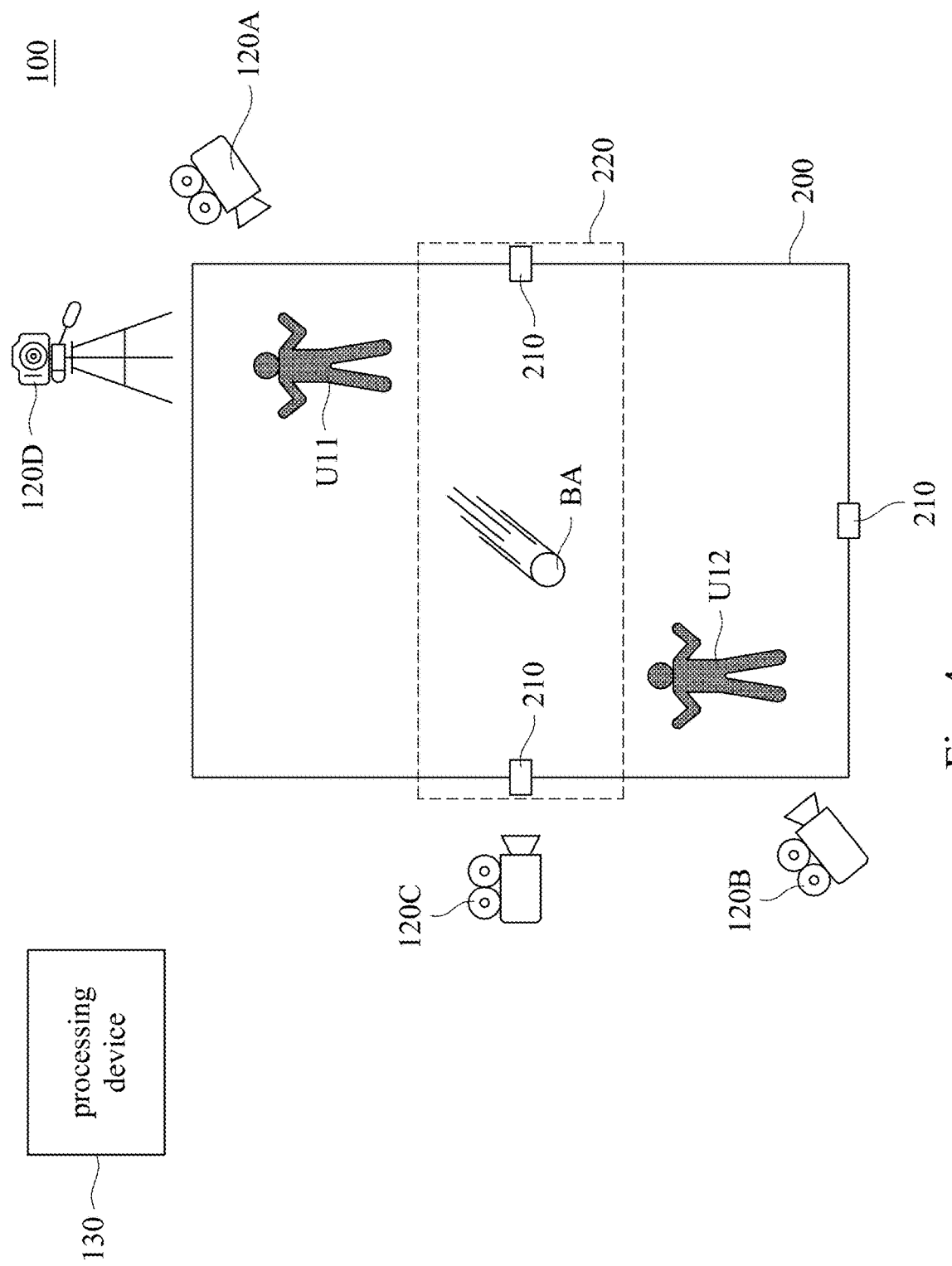
FIG. 4 is a schematic diagram of a video editing system in some embodiments of the present disclosure.

The following describes the method of the aforementioned step S307 "choosing the second camera/the second video". FIG. 4 shows a schematic diagram of a sports situation (e.g., "killing the ball"), which can correspond to the video editing system 100 and the sports field 200 shown in FIG. 1 and FIG. 2. In FIG. 4, the similar components associated with the embodiment of FIG. 1 are labeled with the same numerals for ease of understanding. The specific principle of the similar component has been explained in detail in the previous paragraphs, and unless it has a cooperative relationship with the components of FIG. 4, it is not repeated here.

Referring to FIG. 1 to FIG. 4, in one embodiment, the processing device 130 selects the second camera 120 according to the "movement direction" of the ball trajectory BT. For example, the processing device 130 first selects/chooses/finds the second camera 120B whose arrangement position is closest to the motion direction (e.g., the first motion direction) of the ball trajectory BT. The camera direction of the selected second camera 120B is opposite to the forward direction of the ball trajectory BT, so the second video captured by the second camera 120B can record the movement of the user U11 playing the nice play.

Following the above, the processing device 130 can also selects/chooses/finds the second camera 120B whose arrangement position is closest to a direction (e.g., the second motion direction) opposite to the motion direction of the ball trajectory BT. The camera direction of the selected second camera 120A is the same as the forward direction of the ball trajectory BT, so the second video captured by the second camera 120A can record the ball trajectory of the nice play, and includes the movement of other user U12 (e.g., defender). In other embodiments, after selecting the second video of the second camera 120A, the processing device 130 can additionally select the second video of the second camera 120B to edit multiple second videos.

In some embodiments, when the processing device 130 establishes the coordinate data of the sports field 200, the processing device 130 further provides an operation interface for the user U11 to select/set a region of interest 220 in the sports field 200 (e.g., a middle area of the sports field 200). When determining that the ball trajectory BT meets the editing condition, the processing device 130 finds one second camera with an arrangement position corresponding to the region of interest 220 (e.g., the second camera 120C closest to the region of interest 220), and edits the corresponding second video.

It is particularly emphasized here that the processing device 130 can select one or more of the second videos for editing, and the processing device 130 can combine multiple edited second videos to generate the edited video. For example, when the nice play is detected, the processing device 130 can select three second cameras 120A, 120B, and 120C, and select part of the content from the three second videos to be combined into the edited video. Accordingly, the nice play will be presented from multiple different perspectives.

In some embodiments, the user can use its own camera device (e.g., smartphone or camera) to set it as one of the second cameras to record and edit videos. For the convenience of explanation, the user's camera device is called "user camera" here, and is labeled as 120D in FIG. 4.

Specifically, the user sets the user camera 120D to be communicatively connected to the processing device 130, so as to set the coordinate of the user camera 120D, so that the processing device 130 can identify the user camera 120D and perform subsequent determinations. In one embodiment, the processing device 130 transmits the established coordinate data (e.g., the coordinate system) to the user camera 120D, and the user camera 120D will return/transmit a position data to the processing device 130. For example, the processing device 130 provides a plane (two-dimensional) coordinate data of the sports field 200 to the user camera 120D according to the established coordinate system, so that the display panel of the user camera 120D displays a plane coordinate diagram of the sports field 200. The user can click/select any position in the plane coordinate diagram, and return/transmit the coordinate data of the position back to the processing device 130 to set an arrangement position of the user camera 120D.

Following the above, the processing device 130 identifies the coordinate according to the position data returned by the user camera 120D, and adds the user camera 120D as a new second camera in the video editing system 100. As in the aforementioned step S301, the processing device 130 achieves temporal synchronization with the user camera 120D, and receives a video transmitted from the user camera 120D. Since the user camera 120D is prepared by the user, it can be regarded as the user thinks that the user camera 120D has the most suitable setting angle or position.

In some embodiments, the processing device 130 further includes an target tracking model, and the processing device 130 can estimate the ball trajectory BT by a high-speed object tracking algorithm in the target tracking model. When the ball BA is difficult to detect due to deformation caused by high-speed movement, the ball BT can be trajectory detected/identified/generated with the assistance of the target tracking model.

Figure 5:
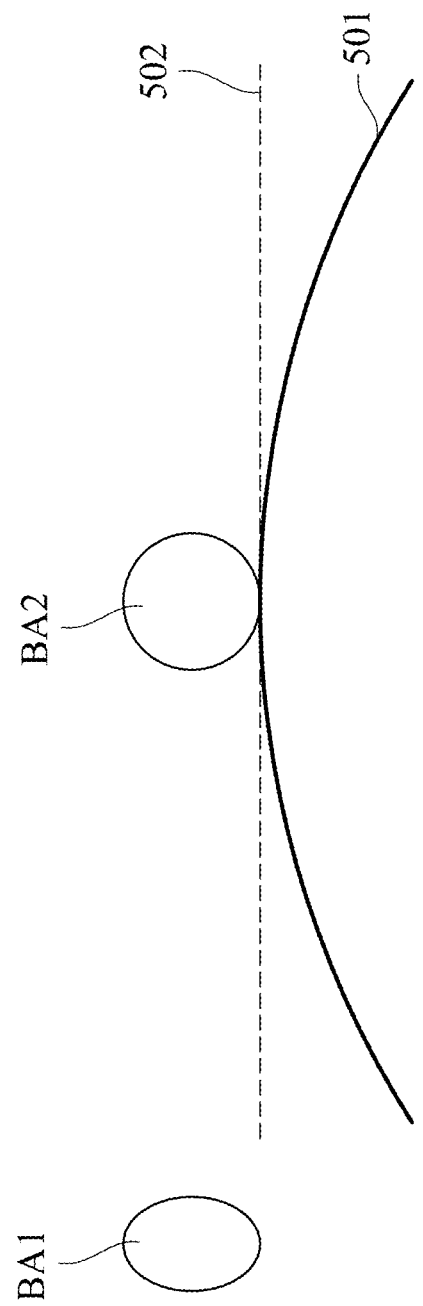
FIG. 5 is a schematic diagram of a processing device detecting a ball in some embodiments of the present disclosure.

FIG. 5 is a schematic diagram that the video editing system 100 applies to a practice field, such as a golf swing practice site or a a baseball batting cage. Since the practice field does not have the area of a formal court, when the user hits the ball, the ball does not move on the field like it does on a formal court. Therefore, the processing device 130 predicts a possible ball trajectory according to the moment of hitting the ball.

For example, when the ball BA1 is hit, the ball BA1 may deform due to high-speed movement. The processing device 130 uses a high-speed object tracking algorithm to calculate and estimate the ball trajectory, as the ball BA2 shown in FIG. 5. In another embodiment, the processing device 130 can calculate and estimate a hitting trajectory 501 (e.g., the swing trajectory of the club/bat), and predict a ball trajectory 502 of the ball BA2 according to the hitting trajectory 501.

Figure 6:
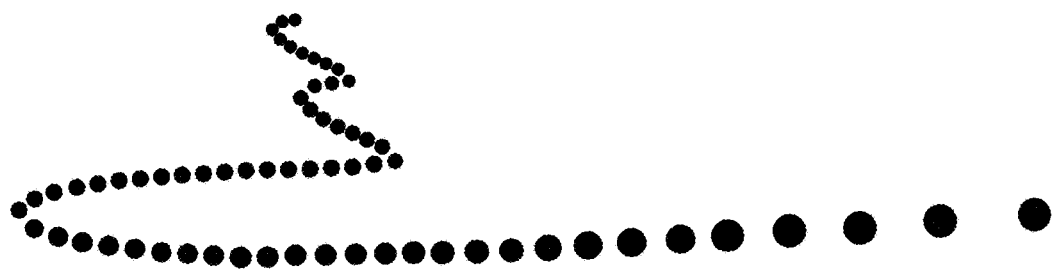
FIG. 6 is a schematic diagram of a ball trajectory in some embodiments of the present disclosure.

In addition, the processing device 130 can further predict a displacement distance of the ball. For example, the processing device 130 analyzes the hitting trajectory 501 and/or the ball trajectory 502 according to an preset virtual court data to predict the movement of the ball in the formal court. FIG. 6 is a schematic diagram that the processing device 130 predicts the ball trajectory BT in some embodiments of the present disclosure. In this embodiment, the processing device 130 analyzes the video of the golf ball to estimate the displacement distance of the golf ball. The estimation result can be used as the aforementioned "motion parameter". If the estimation result is greater than a preset value, it can be regarded as the first video that meets the editing condition, and the edited video can be generated by using the method shown in FIG. 3.

Overall, the video editing system 100 of the present disclosure is not only easy to arrange without high cost, but also can automatically detect/identify the video content to generate the edited video. In addition, the user can easily use the own camera device to capture from any position, so as to record videos from a specific perspective according to the user's needs. Therefore, the video editing system 100 can be easily applied to various types of sports fields and can be used without professional training.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A video editing system, comprising:
    a first camera configured to capture a first video of a sports field;
    a plurality of second cameras configured to capture a plurality of second videos of the sports field, wherein the plurality of second cameras has a plurality of arrangement positions, and the plurality of arrangement positions is different from each other; and a processing device communicatively connected to the first camera and the plurality of second cameras, configured to achieve temporal synchronization among the first camera and the plurality of second cameras, and configured to:

obtain the first video from first camera, and obtain the plurality of second videos from the plurality of second cameras;

detect a ball in the first video;

analyze a ball trajectory to extract a timestamp;

find at least one of the plurality of second cameras corresponding to the ball trajectory and at least one of the plurality of second videos according to the ball trajectory; and edit the at least one of the plurality of second videos according to the timestamp to generate an edited video.

2. The video editing system of claim 1, wherein a camera direction of the first camera is a normal vector of the sports field.

3. The video editing system of claim 1, wherein the processing device or the first camera is configured to detect at least three targets of the sports field to establish a coordinate system of the sports field.

4. The video editing system of claim 3, wherein each of the plurality of second cameras has a corresponding coordinates in the coordinate system.

5. The video editing system of claim 1, wherein when a motion parameter of the ball trajectory meets an editing condition, the processing device is configured to extract the timestamp, and the motion parameter comprises at least one of speed, acceleration, trajectory length and change angle of the ball trajectory.

6. The video editing system of claim 5, wherein the processing device is further configured to:

obtain a reference video; and analyze changes in an image of the reference video to generate the editing condition.

7. The video editing system of claim 1, wherein the processing device is configured to find the at least one of the plurality of second cameras according to a first motion direction of the ball trajectory or a second motion direction opposite to the ball trajectory, so as to obtain the at least one of the plurality of second videos.

8. The video editing system of claim 1, wherein the processing device is configured to find one with a corresponding position of the plurality of second cameras according to a region of interest to obtain the at least one of the plurality of second videos.

9. The video editing system of claim 1, wherein the processing device is further configured to:

when the processing device is communicatively connected to a user camera, transmit a coordinate data to the user camera; and receive a position data transmitted by the user camera to add the user camera as one of the plurality of second cameras.

10. The video editing system of claim 1, wherein the processing device comprises an target tracking model to estimate the ball trajectory.

11. A video editing method, comprising:

achieving temporal synchronization among a processing device, a first camera and a plurality of second cameras;

capturing a first video of a sports field by the first camera, and capturing a plurality of second videos of the sports field by the plurality of second cameras, wherein the plurality of second cameras has a plurality of arrangement positions, and the plurality of arrangement positions is different from each other;

detecting a ball in the first video by the processing device;

analyzing a ball trajectory to extract a timestamp;

finding at least one of the plurality of second cameras corresponding to the ball trajectory and at least one of the plurality of second videos according to the ball trajectory; and editing the at least one of the plurality of second videos according to the timestamp to generate an edited video.

12. The video editing method of claim 11, wherein a camera direction of the first camera is a normal vector of the sports field.

13. The video editing method of claim 11, further comprising:

detecting at least three targets of the sports field; and establishing a coordinate system of the sports field according to the at least three targets.

14. The video editing method of claim 13, wherein each of the plurality of second cameras has a corresponding coordinate in the coordinate system.

15. The video editing method of claim 11, wherein analyzing the ball trajectory to extract the timestamp comprises:

determining whether a motion parameter of the ball trajectory meets an editing condition, wherein the motion parameter comprises at least one of speed, acceleration, trajectory length and change angle of the ball trajectory; and when the motion parameter meets the editing condition, establishing the timestamp.

16. The video editing method of claim 15, further comprising:

obtaining a reference video; and analyzing changes in an image of the reference video to generate the editing condition.

17. The video editing method of claim 11, wherein finding the at least one of the plurality of second cameras corresponding to the ball trajectory and the at least one of the plurality of second videos comprises:

finding the at least one of the plurality of second cameras according to a first motion direction of the ball trajectory or a second motion direction opposite to the ball trajectory, so as to obtain the at least one of the plurality of second videos.

18. The video editing method of claim 11, wherein finding the at least one of the plurality of second cameras corresponding to the ball trajectory and the at least one of the plurality of second videos comprises:

finding one with a corresponding position of the plurality of second cameras according to a region of interest to obtain the at least one of the plurality of second videos.

19. The video editing method of claim 11, further comprising:

when the processing device is communicatively connected to a user camera, transmitting a coordinate data to the user camera, and receiving a position data transmitted by the user camera; and adding the user camera as one of the plurality of second cameras.

20. The video editing method of claim 19, wherein the processing device comprises an target tracking model to estimate the ball trajectory.

* * * * *